(12) United States Patent
Yano

(10) Patent No.: US 7,613,338 B2
(45) Date of Patent: Nov. 3, 2009

(54) IMAGE PROCESSING METHOD AND APPARATUS, PROGRAM, AND STORAGE MEDIUM

(75) Inventor: Kotaro Yano, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 862 days.

(21) Appl. No.: 11/140,994

(22) Filed: Jun. 1, 2005

(65) Prior Publication Data
US 2005/0207642 A1    Sep. 22, 2005

(30) Foreign Application Priority Data
Jun. 3, 2004  (JP) .............................. 2004-166140

(51) Int. Cl.
G06K 9/00 (2006.01)
G06K 9/40 (2006.01)
G06K 9/38 (2006.01)
G09G 5/02 (2006.01)

(52) U.S. Cl. ............... 382/162; 382/254; 382/273; 382/274; 345/589

(58) Field of Classification Search ............. 382/162, 382/274
See application file for complete search history.

(56) References Cited

U.S. PATENT DOCUMENTS

| | | | |
|---|---|---|---|
| 5,012,333 A * | 4/1991 | Lee et al. ................. | 358/520 |
| 5,982,926 A * | 11/1999 | Kuo et al. ................ | 382/167 |
| 6,018,588 A * | 1/2000 | Kim ......................... | 382/167 |
| 6,674,544 B2 | 1/2004 | Shiota et al. ............. | 358/1.9 |
| 7,065,257 B2 * | 6/2006 | Soga et al. ............... | 382/274 |
| 2003/0067638 A1 | 4/2003 | Yano | |
| 2003/0156196 A1 | 8/2003 | Kato et al. | |
| 2005/0012831 A1 | 1/2005 | Yano .......................... | 348/234 |
| 2005/0012832 A1 | 1/2005 | Yano | |

(Continued)

FOREIGN PATENT DOCUMENTS

JP    10-13680    1/1998

(Continued)

OTHER PUBLICATIONS

Durand et al., "Fast Bilateral Filtering for the Display of High-Dynamic-Range Images," Transactions on Graphics, vol. 21, No. 3, Jul. 2002, pp. 257-266.

(Continued)

*Primary Examiner*—Brian P Werner
*Assistant Examiner*—Jose M Torres
(74) *Attorney, Agent, or Firm*—Fitzpatrick, Cella, Harper & Scinto

(57) ABSTRACT

A method and apparatus obtains an image of a proper brightness in various scenes in which it is difficult to appropriately determine the brightness of an image. The apparatus includes a unit which extracts luminance components from image data, a unit which obtains on a predetermined scale the distribution of the extracted luminance components, a unit which sets a middle luminance value for the image data, corrects a luminance value larger than the middle luminance value in the converted luminance distribution to decrease a luminance value before scale conversion that corresponds to the larger luminance value, and corrects a luminance value smaller than the middle luminance value to increase a luminance value before scale conversion that corresponds to the smaller luminance value, and a unit which reproduces the image data by using the enhanced luminance distribution as a new image luminance distribution.

11 Claims, 2 Drawing Sheets

U.S. PATENT DOCUMENTS

2005/0013506 A1  1/2005  Yano

FOREIGN PATENT DOCUMENTS

| JP | 2000-278529 | 10/2000 |
| JP | 2003-92682 | 3/2003 |
| JP | 2003-223636 | 8/2003 |
| JP | 2005-39460 | 2/2005 |

OTHER PUBLICATIONS

Japanese Office Action issued Jul. 18, 2008, in Japanese Application No. 2004-166140.

* cited by examiner

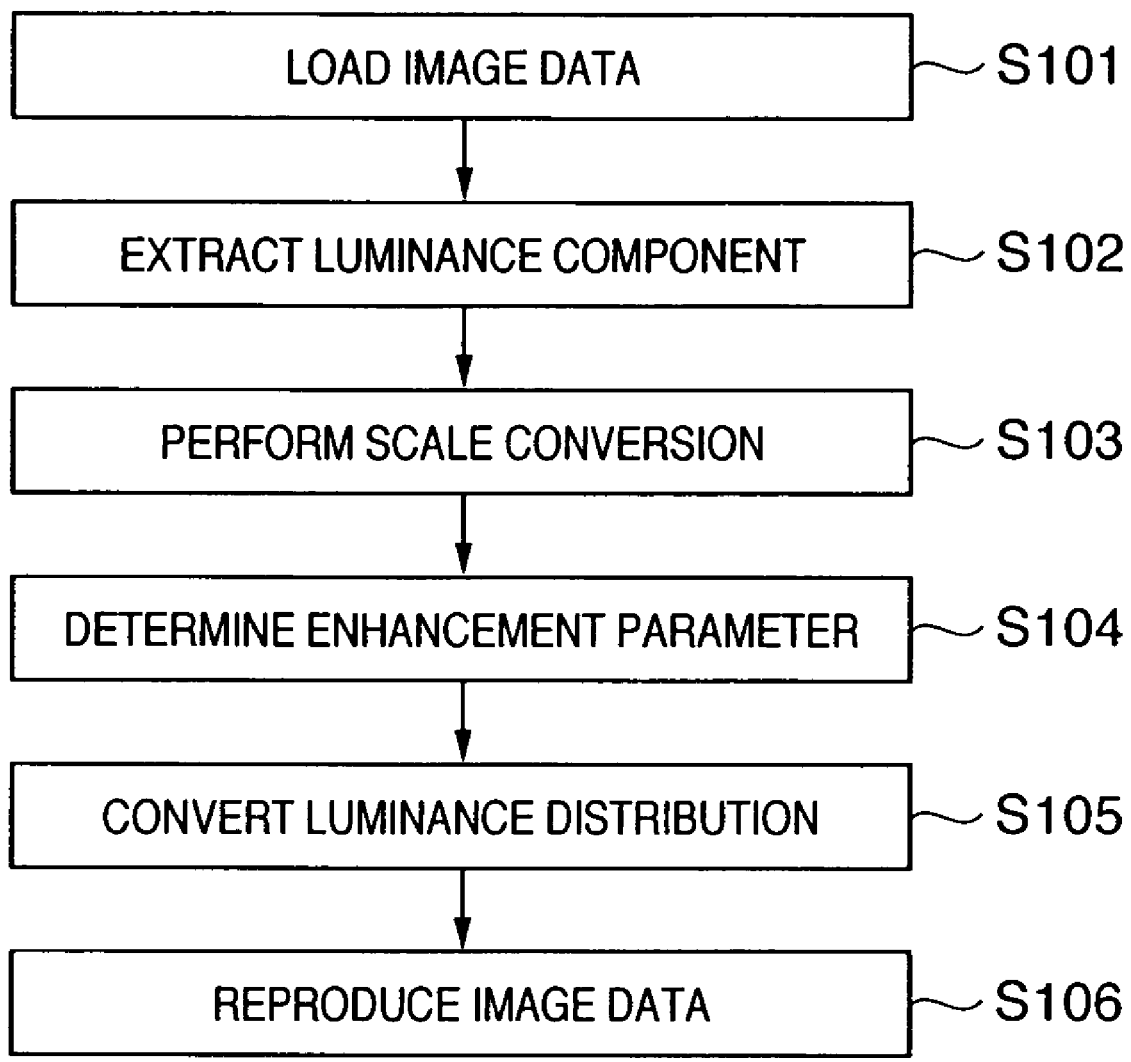

IMAGE PROCESSING METHOD AND APPARATUS, PROGRAM, AND STORAGE MEDIUM

FIELD OF THE INVENTION

The present invention relates to digital image processing and, more particularly, to a technique of improving the brightness distribution of a digital image.

BACKGROUND OF THE INVENTION

As a conventional method of taking a photograph of a proper brightness, there is known a method of measuring the average luminance of a photographing scene and controlling the shutter speed and aperture value of a camera or the like. There is also known an exposure control method using so-called multiple-zone evaluative light-metering in which a scene is divided into predetermined regions and luminance levels measured for the respective regions are weighted to calculate an average luminance, thereby obtaining correct exposure.

However, a main object in a photographed image becomes dark in a so-called backlight scene in which the brightness of the main object to be photographed is much lower than that of the background. To take a photograph of a proper background in such a backlight scene, exposure correction must be done to set the exposure of the camera for a higher brightness than that for an average photograph in photographing. However, this exposure correction operation is cumbersome and needs a lot of skill in order to appropriately set the camera. Even if exposure correction is properly performed for a main object, the background becomes too bright.

As a method which solves this problem, analog photography adopts dodging in a darkroom to attain a print of a proper brightness. To easily implement dodging, it is desirably done by digital image processing.

For this purpose, the present applicant has proposed a method in Japanese Patent Application No. 2003-199125 in which the degree of luminance level enhancement is given as a parameter and the brightness distribution is corrected. This technique can enhance the brightness of the dark region of an image, but there is a room for improvement in the tone reproducibility of the bright region.

As a method which realizes this process, Japanese Patent Application Laid-Open No. 10-13680 discloses an image processing method of independently nonlinearly compressing bright and dark regions without changing a halftone region in order to reproduce the tones of both the bright and dark regions.

However, the user often wants to keep brightnesses of different regions unchanged depending on the image. For example, when a person is photographed in a backlight scene with a bright background, it is desirable to keep the brightness of a region slightly darker than a relatively bright sky region as it is. In a scene with a dark background such as a night scene, it is desirable to keep the brightness of a very dark region intact. The technique disclosed in Japanese Patent Laid-open No. 10-13680, however, cannot control (change) a region whose brightness is to be maintained, and cannot cope with various photographing scenes.

SUMMARY OF THE INVENTION

The present invention has been made to overcome the conventional drawbacks, and has as its object to obtain an image of a proper brightness in various scenes in which it is difficult to appropriately determine the brightness of an image.

To solve the above problems and achieve the above object, according to the first aspect of the present invention, an image processing method comprises a luminance level extraction step of extracting luminance components from image data, a scale conversion step of obtaining on a predetermined scale a distribution of the luminance components extracted in the luminance level extraction step, a luminance level enhancement step of setting a middle luminance value for the image data, correcting a luminance value larger than the middle luminance value in the luminance distribution converted in the scale conversion step so as to decrease a luminance value before scale conversion that corresponds to the larger luminance value, and correcting a luminance value smaller than the middle luminance value so as to increase a luminance value before scale conversion that corresponds to the smaller luminance value, and an image reproduction step of reproducing the image data by using the luminance distribution enhanced in the luminance level enhancement step as a new image luminance distribution.

The image processing method according to the present invention is characterized in that the number of tones of the image data is larger than the number of tones of the image data reproduced in the image reproduction step.

According to the second aspect of the present invention, an image processing method comprises a brightness component extraction step of extracting brightness components from image data, a scale conversion step of obtaining a distribution of the brightness components on a predetermined scale, and a step of performing tone correction for the brightness components on the basis of an output value from the scale conversion step by using a parameter corresponding to a bright region and a parameter corresponding to a dark region.

According to the third aspect of the present invention, a program causes a computer to execute the image processing method.

According to the fourth aspect of the present invention, a storage medium computer-readably stores the program.

According to the fifth aspect of the present invention, an image processing apparatus comprises luminance level extraction means for extracting luminance components from image data, scale conversion means for obtaining on a predetermined scale a distribution of the luminance components extracted by the luminance level extraction means, luminance level enhancement means for setting a middle luminance value for the image data, correcting a luminance value larger than the middle luminance value in the luminance distribution converted by the scale conversion means so as to decrease a luminance value before scale conversion that corresponds to the larger luminance value, and correcting a luminance value smaller than the middle luminance value so as to increase a luminance value before scale conversion that corresponds to the smaller luminance value, and image reproduction means for reproducing the image data by using the luminance distribution enhanced by the luminance level enhancement means as a new image luminance distribution.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is a flowchart showing the algorithm of an application program in the image processing system according to the embodiment of the present invention.

DETAILED DESCRIPTION OF THE PREFERRED EMBODIMENTS

Figure 1:
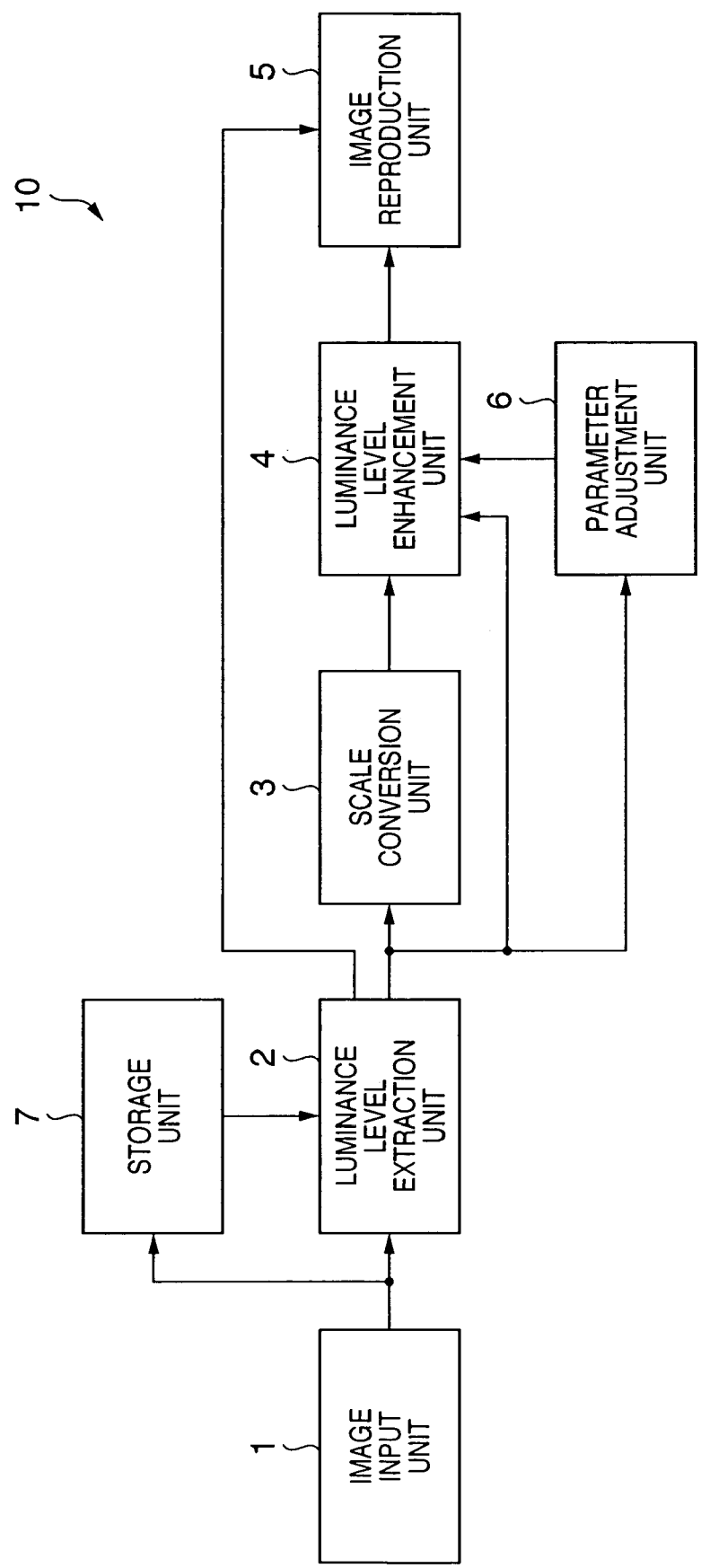
FIG. 1 is a block diagram showing the configuration of an image processing system according to an embodiment of the present invention.

Preferred embodiments of the present invention will be described in detail below with reference to the accompanying drawings.

First Embodiment

FIG. 1 is a block diagram showing the configuration of an image processing system according to the first embodiment of the present invention.

In FIG. 1, reference numeral 1 denotes an image input unit which inputs digital image data (to be referred to as image data hereinafter) to an image processing apparatus 10. The image input unit is formed from a digital camera, scanner, or the like.

Reference numeral 2 denotes a luminance level extraction unit which extracts color components and luminance components representing brightness levels from image data input from the image input unit 1.

Reference numeral 3 denotes a scale conversion unit which obtains on a relatively large scale the distribution of luminance components of image data that are output from the luminance level extraction unit 2.

Reference numeral 4 denotes a luminance level enhancement unit which enhances the distribution of luminance components of image data by using the luminance components of image data that are output from the luminance level extraction unit 2 and the luminance distribution on the relatively large scale that is output from the scale conversion unit 3.

Reference numeral 5 denotes an image reproduction unit which reproduces image data by synthesizing the enhanced luminance components output from the luminance level enhancement unit 4 and the color components output from the luminance level extraction unit 2.

Reference numeral 6 denotes a parameter adjustment unit which adjusts parameters so as to optimize in accordance with image data the degree of enhancing by the luminance level enhancement unit 4 the luminance components of image data that are output from the luminance level extraction unit 2.

Reference numeral 7 denotes a storage unit which stores image data input from the image input unit 1.

The image processing system having the above configuration can be implemented by a general-purpose computer using an application program. In the first embodiment, the functional blocks 2 to 6 of the image processing system shown in FIG. 1 are mainly implemented by an application program. That is, in the following description, the luminance level extraction unit 2, scale conversion unit 3, luminance level enhancement unit 4, image reproduction unit 5, and parameter adjustment unit 6 are implemented on the application program.

FIG. 2 is a flowchart showing the algorithm of an application program which allows a general-purpose computer to implement operation of the functional blocks of the image processing system according to the first embodiment.

When the application program is activated, the user inputs the file name of image data, and the image data is loaded from the image input unit 1 into the storage unit 7 of the computer (step S101).

The loaded image data corresponds to an M×N two-dimensional array (M is the number of horizontal pixels and N is the number of vertical pixels) made up of, e.g., 8-bit pixels, and is formed from three planes of R (Red), G (Green), and B (Blue). The R, G, and B pixels of the image data are defined as R(x,y), G(x,y), and B(x,y) (note that (x,y) is an integer representing the pixel position, and $1 \leq x \leq M$ and $1 \leq y \leq N$). When the image data is compressed by JPEG or the like, the image data is decompressed by a predetermined decompression method into image data made up of R, G, and B pixels.

Luminance components are extracted by the luminance level extraction unit 2 on the basis of the R, G, and B pixels which form the image data (step S102).

In extracting luminance components, for example, R, G, and B pixel components are assumed to be data in the sRGB color space described in IEC 61966-2-1, and converted into CIE 1931 XYZ by gamma conversion and 3×3 matrix operation according to the method described in IEC 61966-2-1. Letting X(x,y), Y(x,y), and Z(x,y) be converted X, Y, and Z data, Y(x,y) is a luminance component to be extracted.

As a method of extracting luminance levels, the above-mentioned process may be simplified to extract a luminance level by only matrix operation. Conversion from RGB into YCbCr, conversion from RGB into L*a*b*, or conversion from RGB into HSV may also be available.

The distribution of luminance components on a relatively large scale is obtained from the extracted luminance components by the scale conversion unit 3 (step S103).

In order to obtain the distribution of luminance components on a relatively large scale, for example, product-sum operation is executed between the extracted luminance components and a Gaussian function to output the sum. To improve the image quality of the enhanced image data, the distributions of luminance components on a plurality of scales are more preferably obtained by executing product-sum operation with a plurality of Gaussian functions with different standard deviations. The above-described process of obtaining the distribution of luminance components on a large scale will be called scale conversion hereinafter. Equation (1) expresses a process of obtaining the distribution of luminance components (low-frequency components out of luminance components) on a large scale:

$$Y_L(x,y) = Avg\{Fn(x,y) * Y(x,y)\} \quad (1)$$

where $Y_L(x,y)$ and $Fn(x,y)$ are a luminance component output and Gaussian function on a large scale, respectively, * is product-sum operation, and Avg is averaging.

A parameter which determines the degree of enhancing the luminance distribution is adjusted by the parameter adjustment unit 6 on the basis of the extracted luminance components (step S104). Parameter adjustment is associated with a process of enhancing the luminance distribution, and will be described in detail.

The distribution of luminance components of the image data is enhanced by the luminance level enhancement unit 4 using the luminance components of the image data and the scale-converted distribution of luminance components (step S105).

In the first embodiment, in a dark region where a scale-converted luminance component is lower than a middle luminance as a result of comparing the scale-converted luminance component and middle luminance, a function of increasing the gain in accordance with the ratio of the middle luminance and scale-converted luminance component is determined, and the luminance component is so enhanced as to amplify the luminance component of the image data. In a bright region where a scale-converted luminance component is higher than a middle luminance as a result of comparing the scale-converted luminance component and middle luminance, a function is determined which increases the gain in accordance with the ratio of the difference between a possible maximum value of the luminance component and the middle luminance and the difference between a possible maximum value of the luminance component and the scale-converted luminance component. Then, a luminance component is so obtained as to amplify the difference between the possible maximum value of the luminance component and the luminance component of the image data, and the difference of the luminance component from the possible maximum value of the luminance component is output as an enhanced luminance component. An output of a luminance component enhanced on the basis of the above-described process is given by For $Y_L(x,y) \leq Ym$, $$Y'(x,y) = \{Ym/Y_L(x,y)\}^{\gamma 1} \cdot Y(x,y)$$

Otherwise (for $Y_L(x,y) > Ym$), $$Y'(x,y) = 1 - \{(1-Ym)/(1-Y_L(x,y))\}^{\gamma 2} \cdot (1-Y(x,y)) \quad (2)$$

where $Y'(x,y)$, $Ym$, $\gamma 1$, and $\gamma 2$ are an output of an enhanced luminance component, a parameter representing a middle luminance, a parameter representing the degree of enhancement in a dark region, and a parameter representing the degree of enhancement in a bright region, respectively.

In the first embodiment, the luminance level is enhanced in both a region (bright region) where a scale-converted luminance component is higher than a middle luminance and a region (bright region) where a scale-converted luminance component is lower than the middle luminance. Alternatively, whether to enhance the luminance level may be set by a user instruction independently for bright and dark regions.

The enhanced luminance components and the color components $X(x,y)$ and $Z(x,y)$ converted in step S102 are synthesized by the image reproduction unit 5 to reproduce image data (step S106).

In this case, the color components are corrected in accordance with a change in luminance components so as to keep the color of the reproduced image data unchanged as much as possible. For example, the color components $X(x,y)$ and $Z(x,y)$ are respectively multiplied by a ratio $Y'(x,y)/Y(x,y)$ before and after changing the luminance component. Then, R, G, and B data are obtained from the X, Y, and Z data. This process is conversion reverse to the process in step S102. Hence, 3×3 matrix operation and inverse gamma conversion are performed to output 8-bit R, G, and B data.

When another method such as conversion from RGB into YCbCr is adopted as a method of extracting luminance components in step S102, corresponding inverse conversion is executed in this process.

An example of the parameter adjustment method in step S104 will be explained in the case of luminance conversion based on equation (2) in step S105.

The luminance components of image data are divided into the ranges of predetermined luminance values to create a luminance histogram. Three luminance values (these luminance values are defined as Y1, Y0, and Y2 in the order from a dark region) are obtained at which the ratios of histogram frequencies accumulated from a dark region to all samples reach predetermined values. The luminance value Y0 may be the average value of luminance components of the image data. At this time, the obtained luminance value Y0 is defined as Ym. $\gamma 1$ and $\gamma 2$ with which the luminance values Y1 and Y2 exhibit predetermined luminance values (these luminance values are defined as Y1' and Y2': Y1≦Y1' and Y2'≦Y2) are set as parameters representing degrees of enhancement. For example, the luminance values Y1' and Y2' corresponding to the luminance values Y1 and Y2 are stored in a table in advance, and obtained by referring to the table. Assuming that $\gamma 1$ and $\gamma 2$ are almost equal to $Y_L(x,y)$ and $Y(x,y)$, equation (3) can be attained:

$$\gamma 1 = (\log Y1' - \log Y1)/(\log Ym - \log Y1)$$

$$\gamma 2 = \{\log(1-Y1') - \log(1-Y1)\}/\{\log(1-Ym) - \log(1-Y1)\} \quad (3)$$

The parameters are automatically adjusted on the basis of the luminance components of image data in the first embodiment, but may be automatically adjusted on the basis of the R, G, and B pixel values of image data. The parameters Ym, $\gamma 1$, and $\gamma 2$ may be interactively adjusted by allowing an input interface to change them, converting the luminance distribution in accordance with the changed parameter values, reproducing image data, and displaying the enhanced image data on the display. The luminance level can be enhanced in only a bright region for $\gamma 1 = 0$ or only a dark region for $\gamma 2 = 0$.

In the above example, a scale-converted luminance component and middle luminance are compared in the luminance distribution enhancement process of step S105, and dark and bright regions are enhanced by different methods. Alternatively, the luminance level may be converted in accordance with equation (4):

$$Y'(x,y) = Y(x,y)^\gamma \quad (4)$$

where $\gamma = (1-G) + G(Y_L(x,y)/Ym)$, and G is a parameter representing the degree of enhancement.

Also in this example, the parameter G may be adjusted automatically or interactively. A scale-converted luminance component and middle luminance may be compared, and the parameter G may be adjusted independently in dark and bright regions.

Equations (2) and (4) described above increase the number of tones to be reproduced by lowering the luminance level in a bright region and raising it in a dark region, thus improving tone reproducibility.

An output in the process of step S103 may be a scale-converted luminance component prepared by applying, to a luminance component, bilateral filtering as reported in Durand et al., "Fast Bilateral Filtering for the Display of High-Dynamic-Range Images", acm Transactions on Graphics, July 2002, Vol. 21, No. 3.

Second Embodiment

The first embodiment assumes 8-bit R, G, and B data as image data to be processed. A case wherein optimal 8-bit R, G, and B image data are reproduced from 16-bit R, G, and B image data will be explained.

The second embodiment will examine an application when image data recorded by a digital camera as 16-bit raw data having a linear relationship with the luminance level of an object is expressed by 8 bits. The flow of this process is substantially the same as that shown in FIG. 2, and the algorithm will be explained with reference to FIG. 2. Details of the process will be simply described for the same operation as that in the first embodiment.

When an application program is activated, the user inputs the file name of image data, and the image data is loaded into a storage unit 7 of a computer (step S101).

The loaded image data corresponds to an M×N two-dimensional array (M is the number of horizontal pixels and N is the number of vertical pixels) made up of, e.g., 16-bit pixels, and is formed from three planes of R (Red), G (Green), and B (Blue). The R, G, and B pixels of the image data are defined as R(x,y), G(x,y), and B(x,y) (note that (x,y) is an integer representing the pixel position, and $1 \leq x \leq M$ and $1 \leq y \leq N$). Assume that the tone of the loaded image data has a linear relationship with the luminance level of an object.

Luminance components are extracted by a luminance level extraction unit 2 on the basis of the R, G, and B pixels which form the image data (step S102).

In extracting luminance components, for example, the R, G, and B pixel components are converted into CIE 1931 XYZ by 3×3 matrix operation according to the method described in IEC 61966-2-1. That is, a value normalized in the range of 0 to 1 is output. Note that no gamma conversion is done because the tone of loaded image data is assumed to have a linear relationship with the luminance level of an object. Letting X(x,y), Y(x,y), and Z(x,y) be converted X, Y, and Z data, Y(x,y) is a luminance component to be extracted.

The distribution of luminance components on a relatively large scale is obtained from the extracted luminance components by a scale conversion unit 3 (step S103). This process is the same as the process in the first embodiment, and a description thereof will be omitted.

A parameter which determines the degree of enhancing the luminance distribution is adjusted by a parameter adjustment unit 6 on the basis of the extracted luminance components (step S104).

The distribution of luminance components of the image data is enhanced by a luminance level enhancement unit 4 using the luminance components of the image data and the scale-converted distribution of luminance components (step S105).

The processes in steps S103 to S105 are the same as those in the first embodiment, and a description thereof will be omitted.

The enhanced luminance components and the color components X(x,y) and Z(x,y) converted in step S102 are synthesized by an image reproduction unit 5 to reproduce image data (step S106).

In this case, the color components are corrected in accordance with a change in luminance components so as to keep the color of the reproduced image data unchanged as much as possible. For example, the color components X(x,y) and Z(x,y) are respectively multiplied by a ratio Y'(x,y)/Y(x,y) before and after changing the luminance component. Then, R, G, and B data are obtained from the X, Y, and Z data. Further, 3×3 matrix operation and inverse gamma conversion are performed to output 16-bit R, G, and B data. Upper 8 bits are extracted from 16 bits of each of the R, G, and B data to output 8-bit R, G, and B data.

In the above description, the tone having a linear relationship with the luminance level of an object is enhanced by the process of step S105. Alternatively, the luminance level may be enhanced by performing inverse gamma conversion in the luminance component extraction process of step S102 and then executing the processes of steps S103 to S105. in this case, no inverse gamma conversion need be performed in the reproduction process of step S106.

In some cases, 16-bit raw data obtained by a digital camera is not distributed over the entire range of the 16-bit tone, but locally distributed in a low range and output. In this case, a correction process based on a tone curve for enhancing the contrast is executed for 16-bit R, G, and B outputs to provide final 8-bit R, G, and B outputs.

For example, a luminance histogram is created from 16-bit R, G, and B outputs, and the luminance levels of bright and dark regions are obtained at which frequencies accumulated from the bright and dark regions reach predetermined ratios. Mappings which convert these luminance levels into maximum and minimum levels are attained and applied to R, G, and B values to provide 8-bit outputs. Further, so-called S-curve tone conversion may be done to make solid some bright and dark regions for correcting tone reproducibility in the middle range.

A luminance histogram may be created in advance for luminance components extracted in step S102, and luminance levels may be corrected so that, for example, luminance levels having a frequency of about 0.1% from bright and dark regions are defined as maximum and minimum values (i.e., 65535 and 0) at 16 bits.

When the number of tones of original image data is larger than that of image data to be output, like the second embodiment, the original image data can be reproduced by fully exploiting its tone reproducibility.

The above-described process can be applied to, e.g., a tone compression process in a digital camera because the digital camera has the number of tones exceeding 8 bits for each of R, G, and B data.

The above-described process can be widely applied to compression to a predetermined number of tones such as conversion of camera tones into printer tones because the number of reproduction tones of a camera is generally larger than that of a display or printer. The above-described process can also be applied to compression of an image whose dynamic range is widened by synthesizing a plurality of digital images photographed by a camera. The above-described process can also be applied as tone compression when the number of tones of image data processed by a computer is larger than the number of reproduction tones of a printer.

As described above, according to the above embodiments, in an image processing system comprising a luminance level extraction means for extracting luminance components from image data, a scale conversion means for obtaining the distribution of the luminance components on a relatively large scale, a luminance level enhancement means for enhancing the luminance distribution of the image data by using the luminance components and an output from the scale conversion means, and an image reproduction means for reproducing the image data by using an output from the luminance level enhancement means as a new image luminance distribution, the luminance level enhancement means sets a middle luminance, and the luminance distribution of the image data is so enhanced as to set the output from the luminance level enhancement means smaller than an original luminance component when the output from the scale conversion means is larger than the middle luminance, and set the output from the luminance level enhancement means larger than the original luminance component when the output from the scale conversion means is smaller than the middle luminance. A region of middle brightness of a digital image to be processed where brightness is to be kept unchanged can be controlled in accordance with the image, and bright and dark regions can be enhanced.

As described above, the above embodiments can obtain an image of a proper brightness in various scenes in which it is difficult to appropriately determine the brightness of an image.

Other Embodiment

The above-described embodiments adopt a luminance component as a component representing brightness, but the present invention may employ another component representing brightness such as an L value in the LCH space or a G component among R, G, and B components.

The object of the above-described embodiments is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the present invention includes a case wherein an OS (Operating System) or the like running on the computer performs some or all of actual processes on the basis of the instructions of the program codes and these processes realize the functions of the above-described embodiments.

Furthermore, the present invention includes a case in which, after the program codes read out from the storage medium are written in the memory of a function expansion card inserted into the computer or the memory of a function expansion unit connected to the computer, the CPU of the function expansion card or function expansion unit performs some or all of actual processes on the basis of the instructions of the program codes, and these processes realize the functions of the above-described embodiments.

When the present invention is applied to the storage medium, the storage medium stores program codes corresponding to the above-described flowchart.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2004-166140 filed on Jun. 3, 2004, which is hereby incorporated by reference herein.

What is claimed is:

1. An image processing method performed by an image processing system, said method comprising:
  a luminance level extraction step of extracting, with the image processing system, luminance components from image data;
  a scale conversion step of obtaining, with the image processing system, on a predetermined scale a distribution of the luminance components extracted in the luminance level extraction step;
  a luminance level enhancement step of setting, with the image processing system, a middle luminance value for the image data, correcting a luminance value larger than the middle luminance value in the luminance distribution converted in the scale conversion step so as to decrease a luminance value before scale conversion that corresponds to the larger luminance value, and correcting a luminance value smaller than the middle luminance value so as to increase a luminance value before scale conversion that corresponds to the smaller luminance value; and
  an image reproduction step of reproducing, with the image processing system, the image data by using the luminance distribution enhanced in the luminance level enhancement step as a new image luminance distribution,
  wherein in the luminance level enhancement step, letting A be a luminance component value output in the luminance level extraction step, B be a luminance component value output in the scale conversion step, C be the middle luminance, and D and E be luminance level enhancement parameters, a luminance level is converted on the basis of a characteristic given by for $B \leq C$, $(C/B)^D \cdot A$ for $B > C$, $1 - \{(1-C)/(1-B)\}^E \cdot (1-A)$.

2. The method according to claim 1, wherein the number of tones of the image data is larger than the number of tones of the image data reproduced in the image reproduction step.

3. A computer-readable storage medium storing a program causing a computer to execute an image processing method defined in claim 1.

4. An image processing method performed by an image processing system, said method comprising:
  a luminance level extraction step of extracting, with the image processing system, luminance components from image data;
  a scale conversion step of obtaining, with the image processing system, on a predetermined scale a distribution of the luminance components extracted in the luminance level extraction step;
  a luminance level enhancement step of setting, with the image processing system, a middle luminance value for the image data, correcting a luminance value larger than the middle luminance value in the luminance distribution converted in the scale conversion step so as to decrease a luminance value before scale conversion that corresponds to the larger luminance value, and correcting a luminance value smaller than the middle luminance value so as to increase a luminance value before scale conversion that corresponds to the smaller luminance value; and
  an image reproduction step of reproducing, with the image processing system, the image data by using the luminance distribution enhanced in the luminance level enhancement step as a new image luminance distribution,
  wherein in the luminance level enhancement step, letting A be a luminance component value output in the luminance level extraction step, B be a luminance component value output in the scale conversion step, C be the middle luminance, and D be a luminance level enhancement parameter, a luminance level is converted on the basis of a characteristic given by $A^{\{(1-D)+D(B/C)\}}$.

5. A computer-readable storage medium storing a program causing a computer to execute an image processing method defined in claim 4.

6. An image processing apparatus comprising:
a luminance level extraction unit which extracts luminance components from image data;
a scale conversion unit which obtains on a predetermined scale a distribution of the luminance components extracted by said luminance level extraction unit;
a luminance level enhancement unit which sets a middle luminance value for the image data, corrects a luminance value larger than the middle luminance value in the luminance distribution converted by said scale conversion unit so as to decrease a luminance value before scale conversion that corresponds to the larger luminance value, and corrects a luminance value smaller than the middle luminance value so as to increase a luminance value before scale conversion that corresponds to the smaller luminance value; and
an image reproduction unit which reproduces the image data by using the luminance distribution enhanced by said luminance level enhancement unit as a new image luminance distribution,
wherein letting A be a luminance component value output from said luminance level extraction unit, B be a luminance component value output from said scale conversion unit, C be the middle luminance, and D and E be luminance level enhancement parameters, said luminance level enhancement unit converts a luminance level on the basis of a characteristic given by for $B \leq C$, $(C/B)^D \cdot A$ for $B > C$, $1 - \{(1-C)/(1-B)\}^E \cdot (1-A)$.

7. The apparatus according to claim 6, wherein the number of tones of the image data is larger than the number of tones of the image data reproduced by said image reproduction device.

8. An image processing apparatus comprising:
a luminance level extraction unit which extracts luminance components from image data;
a scale conversion unit which obtains on a predetermined scale a distribution of the luminance components extracted by said luminance level extraction unit;
a luminance level enhancement unit which sets a middle luminance value for the image data, corrects a luminance value larger than the middle luminance value in the luminance distribution converted by said scale conversion unit so as to decrease a luminance value before scale conversion that corresponds to the larger luminance value, and corrects a luminance value smaller than the middle luminance value so as to increase a luminance value before scale conversion that corresponds to the smaller luminance value; and
an image reproduction unit which reproduces the image data by using the luminance distribution enhanced by said luminance level enhancement unit as a new image luminance distribution,
wherein letting A be a luminance component value output from said luminance level extraction unit, B be a luminance component value output from said scale conversion unit, C be the middle luminance, and D be a luminance level enhancement parameter, said luminance level enhancement unit converts a luminance level on the basis of a characteristic given by $A^{\{(1-D)+D(B/C)\}}$.

9. An image processing apparatus, comprising:
a luminance level extraction unit which extracts luminance components from image data;
a low frequency component calculation unit which calculates a low frequency component in the luminance components extracted by said luminance level extraction unit;
an obtaining unit which obtains three different luminance values Y1, Y0 and Y2 (Y1<Y0<Y2) from a histogram of the luminance components;
a setting unit which sets a first parameter γ1 for a dark region by using the luminance values Y1, Y0 and Y1' that corresponds to the luminance value Y1 and is stored in advance and sets a second parameter γ2 for a bright region by using the luminance values Y2, Y0 and Y2' that corresponds to the luminance value Y2 and is stored in advance; and
a correction unit which corrects luminance such that luminance of the dark region is increased and luminance of the bright region is decreased by correcting the luminance components by using the luminance value Y0, the first parameter and the low frequency component in a case that the low frequency component is smaller than the luminance value Y0 and by correcting the luminance components by using the luminance value Y0, the second parameter and the low frequency component in a case that the low frequency component is larger than the luminance value Y0.

10. An image processing method performed by an image processing system, said method comprising:
a luminance level extraction step of extracting, with the image processing system, luminance components from image data;
a low frequency component calculation step of calculating, with the image processing system, a low frequency component in the luminance components extracted in said luminance level extraction step;
an obtaining step of obtaining, with the image processing system, three different luminance values Y1, Y0 and Y2 (Y1<Y0<Y2) from a histogram of the luminance components;
a setting step of setting, with the image processing system, a first parameter γ1 for a dark region by using the luminance values Y1, Y0 and Y1' that corresponds to the luminance value Y1 and is stored in advance and setting a second parameter γ2 for a bright region by using the luminance values Y2, Y0 and Y2' that corresponds to the luminance value Y2 and is stored in advance; and
a correction step of correcting, with the image processing system, luminance such that luminance of the dark region is increased and luminance of the bright region is decreased by correcting the luminance components by using the luminance value Y0, the first parameter and the low frequency component in a case that the low frequency component is smaller than the luminance value Y0 and by correcting the luminance components by using the luminance value Y0, the second parameter and the low frequency component in a case that the low frequency component is larger than the luminance value Y0.

11. A computer-readable storage medium storing a program causing a computer to execute an image processing method defined in claim 10.

* * * * *